Figure 3:
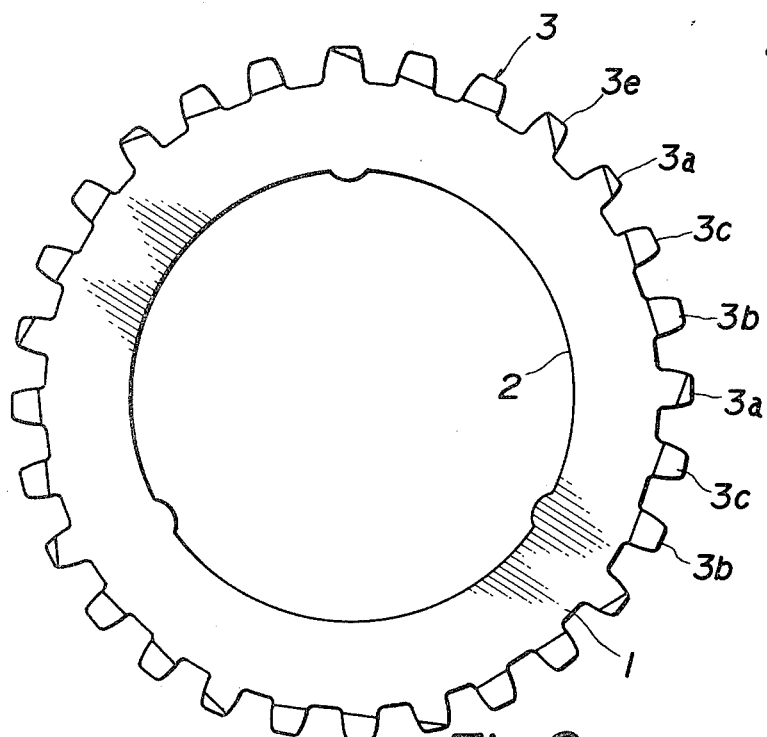

United States Patent [19]

Nagano

[11] 4,330,286

[45] May 18, 1982

[54] SPROCKET FOR BICYCLE AND THE LIKE

[75] Inventor: Masashi Nagano, Sakai, Japan

[73] Assignee: Shimano Industrial Company Limited, Osaka, Japan

[21] Appl. No.: 106,048

[22] Filed: Dec. 21, 1979

Related U.S. Application Data

[63] Continuation of Ser. No. 933,572, Aug. 14, 1978, abandoned.

[30] Foreign Application Priority Data

Aug. 17, 1977 [JP] Japan .................................. 52-110437
Aug. 17, 1977 [JP] Japan .................................. 52-110438

[51] Int. Cl.³ ............................................. F16H 55/30
[52] U.S. Cl. ..................................... 474/164; 474/152
[58] Field of Search .............. 74/217 B, 217 C, 217 S, 74/243 R, 243 DR, 594.2, 229, 242.14 B, 242.15 B, 242.11 B; 474/164

[56] References Cited

U.S. PATENT DOCUMENTS

| | | | |
|---|---|---|---|
| 619,537 | 2/1899 | Bufford | 74/243 R |
| 1,202,227 | 10/1916 | Sandifur | 74/217 C |
| 1,221,471 | 4/1917 | Miller | 74/243 R |
| 3,167,175 | 1/1965 | Kools | 74/243 R |
| 3,661,021 | 5/1972 | Ohshita | 74/217 B |
| 3,709,053 | 1/1973 | Ohshita | 74/243 R |
| 3,956,943 | 5/1976 | Yamasaki | 74/243 R |

FOREIGN PATENT DOCUMENTS

| | | | |
|---|---|---|---|
| 445426 | 2/1949 | Italy | 74/217 B |
| 18240 | of 1900 | United Kingdom | 74/217 B |

OTHER PUBLICATIONS

Shimano World p. 9, vol. 5, No. 2, Summer 1977.

*Primary Examiner*—Leslie Braun
*Attorney, Agent, or Firm*—Stevens, Davis, Miller & Mosher

[57] ABSTRACT

A sprocket for a bicycle and the like comprising a sprocket body having many teeth provided on the outer periphery of the body. At least two adjacent teeth among these teeth are arranged in a row along an inclined line which inclines with respect to the central line along the thickness direction of the sprocket body, and the teeth located in the end portion, in the group of teeth arranged in the row are arranged in the same direction along the inclined line.

5 Claims, 8 Drawing Figures

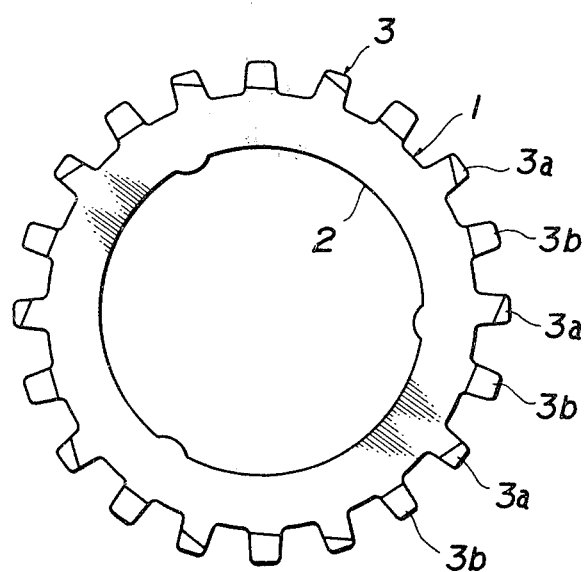
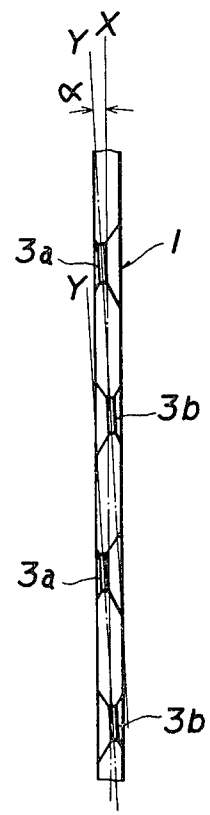
Fig. 1
Fig. 2

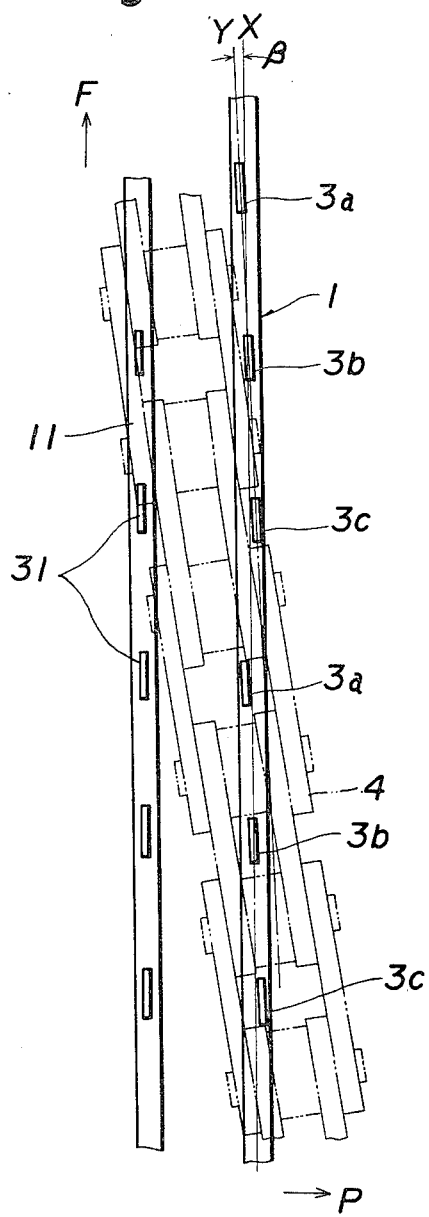

SPROCKET FOR BICYCLE AND THE LIKE

This is a Continuation of application Ser. No. 933,572 filed Aug. 14, 1978, now abandoned.

The present invention relates to a sprocket for a bicycle and the like, and more particularly to a sprocket, which comprises a sprocket body with a circular outer periphery thereon and a plurality of gear teeth provided on the outer periphery of the body to engage the chain to transmit the pedalling force to the rear wheel.

In general, in a bicycle, a rear gear or a front gear each being constructed through the combination of two or more sprockets having a different number of teeth is mounted on a rear wheel hub or a crank. The chain is moved in the axial direction of the sprocket by a derailluer to transfer the chain to one of the sprockets whereby the pedalling force is transmitted to the rear wheel at a given speed change ratio.

Since the conventional sprocket has its teeth disposed in parallel to the side of the sprocket body or, in other words, in parallel to a central line, along the thickness direction, of the body and on the same line, the side edge of the link plate in the chain comes into interference with the addendum portion of the teeth, thus preventing the quick and smooth engagement when the chain is displaced by the derailleur to select a sprocket for engagement with the chain for changing the speed change ratio. This is particularly evident when the chain is transferred from a small diameter sprocket with a small number of gear teeth thereon to a large diameter sprocket with a larger number of gear teeth thereon. Accordingly, the engagement is delayed, thus causing a slipping phenomenon or noise phenomenon.

Also, a conventional sprocket is proposed wherein the position of many teeth provided on the outer periphery of the sprocket body are deviated, on both side edges, alternately in zigzag shape with respect to the central line along the thickness direction of the sprocket body to reduce the interference between the chain link plate side edge and the addendum portion of the teeth. However, since the teeth in the sprocket are provided parallel to the central line, the chain is difficult to engage when the chain is transferred. The interference is still present and the approach from the small diameter sprocket of the chain onto the large diameter sprocket side is undesirable. Accordingly, the chain is difficult to engage with the sprocket teeth. On the whole, the chain cannot be quickly and smoothly engaged with the large diameter sprocket teeth.

Thus, the present inventor proposed a sprocket wherein many teeth are provided on the outer periphery of the sprocket body inclined with respect to the central line, along the thickness direction, of the sprocket body so that the chain link plate side edge could not come into contact with the addendum portion of the teeth during the speed changing operation thereby avoiding interference. In this case, as the lengthwise ends of the tip end edges of the teeth are inclined until the ends of tip end edges are positioned across the thickness of the sprocket body, the inclined angle of each of the teeth with respect to the central line becoming greater. As a result, the catching operation of the chain during the speed change can be improved. On the other hand, the slipping phenomenon was caused due to the chain link plate on the addendum. The chain was found to be difficult to move from the small diameter sprocket onto the large sprocket side during its transfer to the larger diameter sprocket. Also, when the inclined angle of the teeth with respect to the central line X was made smaller to remove the slipping phenomenon, the above described problem was solved. However, a gap was caused between the lengthwise ends of the tip end edge of the tooth and the ends of the sprocket body along the thickness direction. As a result, the catching of the chain, during the speed change became difficult to effect, thus resulting in inferior speed changing. Accordingly, the conventional problems could not be removed.

The present invention was provided to remove these problems. An object of the present invention is to provide a sprocket wherein the catching of the chain with the sprocket teeth during the speed change can be performed smoothly, the engagement of the chain with the sprocket teeth can be performed easily, and the chain can be easily moved onto the larger diameter sprocket side, particularly, from the smaller diameter sprocket.

The present invention is characterized in that at least two adjacent teeth, from many teeth provided on the outer periphery of the sprocket body, are arranged in a row along an inclined line, which inclines, with respect to the central line of the sprocket body along the thickness direction, and the teeth located at the end portion of the group of teeth arranged in a row are inclined in the same direction along the inclined line.

Figure 4:
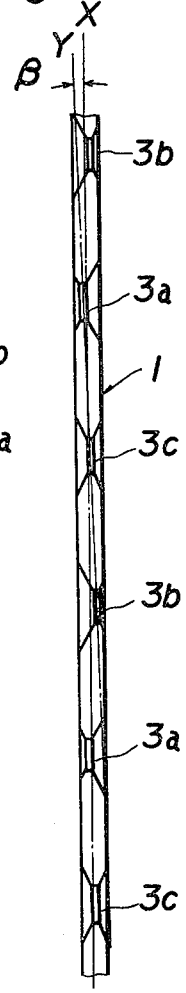
Figure 5:
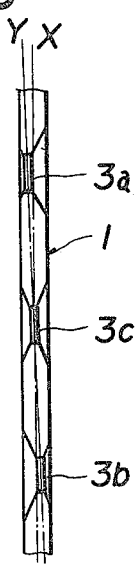
Figure 6:
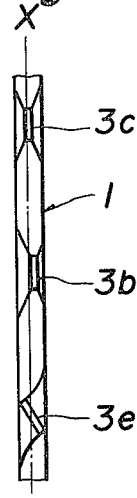
Figure 7:
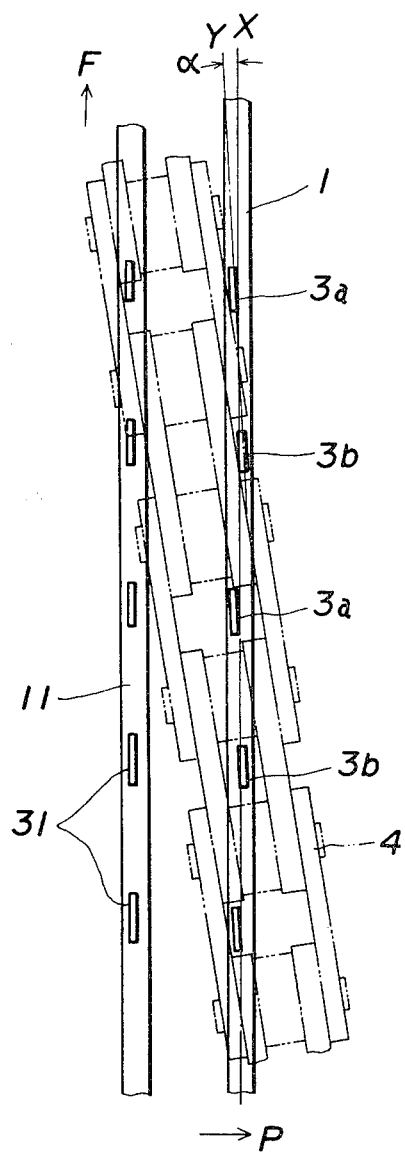

The other objects and the novel construction of the present invention will become more apparent from the description of the embodiment with reference to the drawings, in which FIG. 1 is a front view of the present invention, FIG. 2 is a partial enlarged side view, FIG. 3 to FIG. 6 show another embodiment, FIG. 3 is a front view thereof, FIG. 4 to FIG. 6 are partial enlarged side views, and FIG. 7 and FIG. 8 are enlarged side views showing the embodiment of the combined bodies, showing the engaged condition with the chain.

Referring to the drawings, numeral 1 is a sprocket body which has a circular outer periphery thereon and a central hole 2 at its central portion, many teeth 3, . . . being provided, at given spaces, on the outer periphery.

The front end edges of the teeth 3, . . . are chamfered. At least two adjacent teeth 3a and 3b from the many teeth 3, . . . are arranged in a row along an inclined line Y, which inclines by a given angle with respect to the central line X, along the thickness direction, of the body 1 as shown in FIG. 2. In a group of teeth arranged in a row, the teeth positioned at the ends along the row direction, namely, the teeth 3a and 3b located on the side edge of the sprocket body 1 are inclined in the same direction along the inclined line Y. The group of teeth which comprises at least the two adjacent teeth 3a and 3b is one set. Either one set or a plurality of sets may be constructed as hereinabove. Also, it is preferable to have two or three teeth as the number of teeth which constitutes the group of teeth. The sprocket with many teeth thereon, namely, the high speed sprocket of the front gear which may be formed with, for example, fifty two teeth, can be constituted with four or more teeth.

However, when the group of teeth comprises three adjacent teeth as one set, these teeth 3a, 3b and 3c are arranged in a row in the same direction along the inclined line Y as shown in FIG. 4 and are inclined in the same direction along the inclined line Y. The middle tooth 3c among these teeth 3a, 3b and 3c may be positioned in parallel to the central line X in a position along the inclined line Y as shown in FIG. 5. When two or more teeth 3a, 3b or 3c are formed into the group of teeth as one set as described hereinabove and a plurality of sets of teeth groups are formed, the fractional teeth 3e when a fraction is produced may be inclined with respect to the central line X within the thickness of the body 1 as shown in FIG. 6, or may be in parallel to the central line X.

Also, the sprocket as described hereinabove comprises a single sprocket body 1 which is provided with many gear teeth 3 on its outer periphery. Two or more sprocket bodies or more may be used. Namely, as shown in FIG. 7 and FIG. 8, the sprocket may be a combination of a first sprocket body 11 and a second sprocket body 1, which is larger in diameter than the body 11 and has more teeth than the teeth 31 provided peripherally on the body 11.

In this case, in the teeth 3 provided peripherally on the second sprocket body 1 as described hereinabove, adjacent two teeth 3a, 3b or three teeth 3a, 3b, 3c are arranged in a row along an inclined line Y which inclines with respect to the central line X, of the thickness direction, of the second sprocket body 1 as shown in FIG. 7 and FIG. 8. As described hereinabove, the teeth 3a and 3b located in the end portion of the teeth positioned in a row are inclined in the same direction as the inclined direction of the inclined line Y. The line Y in the combined body constructed as hereinabove is inclined so that the front side of the chain may be displaced on the first sprocket body 11 in the rotating direction along the normal direction of the second sprocket body 1, namely, in the rotating direction in a case where the chain 4 engaging the teeth 3 moves in the advancing direction of the bicycle.

Namely, since the speed change problem occurs during the speed change from the teeth 31 of the small diameter first sprocket body 1 to the teeth 3 of the larger diameter second sprocket body 1 when a multistage sprocket is formed through the combination of two or more sprockets, each being different in number of teeth, the inclined line Y is inclined on the rotating direction side (an arrow F side of FIG. 7 and FIG. 8) of the body 1 towards the inner side from the outer side face of the second sprocket body 1 if the side facing the first sprocket body 11 of the second sprocket body 1 is made an inner side face.

However, the combined body of the sprocket constructed as described hereinabove is mounted on the crank or the rear wheel hub and is used as a front gear or a rear gear. The chain 4 is displaced by the derailleur and is transferred to one of the sprockets to transmit the pedalling force to the rear wheel at a given speed. Since the speed change problem occurs during the chain transfer to the large diameter second sprocket body 1 from the teeth 31 of the small diameter first sprocket body 11 as described hereinabove, the teeth 3 of the second sprocket body 1 are inclined as described hereinabove as shown in FIG. 7 and FIG. 8 in the case of the combined body formed by two sprockets each having a different number of teeth. The teeth 31 of the smaller diameter first sprocket body 11 are made parallel to the central line X. Also, when three to five sprocket bodies each having a different number of teeth are combined and are used as the rear gear, the teeth of the smallest diameter sprocket body for high speed use are made parallel to the central line X as described hereinabove and the remaining sprocket body teeth are inclined. In this case, as shown in FIG. 7 and FIG. 8, the tip end line of each tooth is constructed, towards the advancing direction F of the chain so that the front edge may face the smaller diameter sprocket body 11.

When the chain 4 is transferred by the derailleur in the combined body constructed as described above, the engagement of the chain 4 with the teeth of each of sprocket bodies 1 and 11 will be described with reference to FIG. 7.

According to FIG. 7, when the chain 4 engaged with the teeth 31 of the first sprocket body 11 is displaced by the derailleur under a condition where the movable member of the derailleur is moved in the direction of an arrow P and the chain 4 is transferred from the teeth 31 of the first sprocket body 11 having a small number of teeth to the teeth 3 of the second sprocket body 1 having a large number of teeth, the chain 4 positioned on the rotating direction front side of these sprocket bodies 1 and 11 remains on the teeth 31 of the first sprocket body 11, and the chain 4 positioned on the operation side of the derailleur is overshifted to the side of the second sprocket body 1 and is inclined as shown in FIG. 7.

Since, at this time, a pair of teeth 3a and 3b in the teeth 3, . . . of the second sprocket body 1 are inclined in the same direction as the inclined direction of the chain 4, the link plate side edge of the chain 4 does not come into contact against and interfere with the tip end edge of the tooth 3a on the first sprocket body 11 side. The link plate side edge of the chain can catch the chain 4 quickly to the teeth and engage it smoothly. Namely, in this case, a pair of teeth 3a and 3b are arranged along the inclined line Y which inclines with respect to the central line X to reduce the inclined angle α of the teeth 3a and 3b with respect to the central line X. Thus, the link plate of the inclined chain 4 is not ridden on the tip end edge of the tooth 3a, which first catches the chain 4. The tooth 3a can catch the chain 4 rapidly. The smaller inclined angle α can reduce the torsion of the inclined chain 4 to easily move the chain 4 onto the side of the second sprocket body 1. When the tip end edge of the tooth 3a, which first catches the chain 4, is approached towards the side face edge of the second sprocket body 1, the catching of the tooth 3a by the chain 4 is further improved. It catches the inclined chain 4 quickly to make a smooth engagement, thus resulting in an extremely improved speed change property.

Also, when the teeth 31 of the first sprocket body 11 are inclined as the teeth 3 of the second sprocket body are, the chain 4 which remains engaged with the teeth 31 of the first sprocket body 11 during the speed change operation, separates smoothly and quickly. The engagement thereof with the teeth 3 of the second sprocket body 1 can be performed quickly and smoothly and the chain 4 can be transferred to the teeth 3 of the second sprocket body 1 in a shorter time period.

Also, as shown in FIG. 4 and FIG. 8, when the adjacent three teeth 3a, 3b, 3c out of the many teeth 3, . . . are inclined as a group as described hereinabove, the inclined angle β of the teeth 3a, 3b, 3c with respect to the central line X can be made smaller than the inclined angle α. Thus, the inclined chain 4 can be easily moved towards the second sprocket body 1 side. The speed change property can be further improved as compared with the adjacent two teeth as a group.

As described hereinabove, according to the present invention, at least two adjacent teeth out of many teeth provided on the outer periphery of the sprocket body are arranged in a row along an inclined line which inclines with respect to the central line, along the thickness direction, of the sprocket body. The teeth located on the end portion in the group of teeth arranged in a row are inclined in the same direction along the inclined line to improve the catching of the teeth on the large diameter sprocket body by the chain when the speed change operation is effected to transfer the chain from the teeth of the small diameter sprocket body to the teeth of the large diameter one by the derailleur. The chain link plate is prevented from riding on the teeth of the large diameter sprocket body and the chain approaching from the smaller diameter sprocket body onto the large diameter sprocket body side is facilitated. Accordingly, the chain is caught quickly during transfer performing the smoother engagement, thus resulting in an improved speed change.

As many apparently widely different embodiments of this invention may be made without departing from the spirit and scope thereof, it is to be understood that the invention is not limited to the specific embodiment thereof except as defined in the appended claims.

What is claimed is:

1. A sprocket assembly of at least two sprocket bodies for a bicycle for selecting a driving chain, said chain being shiftable along a line which is angular to the sprocket comprising:
   a first circular sprocket body having a plurality of teeth along the periphery thereof, said teeth having a cross-section for receiving a driving chain and
   a second circular sprocket body having a diameter larger than the diameter of said first circular sprocket body coaxial with said first circular body having a plurality of teeth radially extending thereof, at least two of said teeth having a rectangular cross-section, the major axes of said two teeth coinciding with an inclined line inclined away from said second sprocket body towards said first sprocket body in the direction of movement of said bicycle, whereby said two teeth are easily meshed with said chain during shifting of said chain.

2. The sprocket assembly of claim 1, wherein said second circular sprocket body has at least three adjacent teeth arranged in a row, the teeth at the end of said row having their major axes inclined along said inclined line, and the remaining tooth having a major axis coincident with the center line of said second sprocket body.

3. The sprocket of claim 1, wherein said two teeth are located near an edge of said sprocket body.

4. A sprocket assembly for a bicycle for selecting a driving chain, said chain being shiftable along a line which is angular to the sprocket comprising:
   a first circular sprocket body having a plurality of teeth along a periphery thereof, said teeth having a cross-section for receiving a driving chain and
   a second circular sprocket body coaxial with said first circular body having a plurality of teeth radially extending thereof, said plurality of teeth including two sets of teeth, at least two teeth in each set having a rectangular cross-section with a major and minor axis, the major axis of said two teeth coinciding with an line inclined away from a center line of said sprocket body whereby said two teeth are easily meshed with said chain during shifting of said chain.

5. The sprocket assembly of claim 4, wherein the teeth of said first circular sprocket body have a major axis in parallel with the centerline of said first sprocket.

* * * * *